(12) United States Patent
Gelencser

(10) Patent No.: US 10,549,456 B2
(45) Date of Patent: Feb. 4, 2020

(54) METHOD AND APPARATUS FOR UTILIZATION OF PLASTIC AND OTHER WASTE MATERIALS

(71) Applicant: Gabor Gelencser, Solt (HU)

(72) Inventor: Gabor Gelencser, Solt (HU)

(*) Notice: Subject to any disclaimer, the term of this patent is extended or adjusted under 35 U.S.C. 154(b) by 609 days.

(21) Appl. No.: 15/526,947

(22) PCT Filed: Mar. 25, 2014

(86) PCT No.: PCT/IB2014/000422
§ 371 (c)(1),
(2) Date: May 15, 2017

(87) PCT Pub. No.: WO2015/145189
PCT Pub. Date: Oct. 1, 2015

(65) Prior Publication Data
US 2019/0084189 A1    Mar. 21, 2019

(51) Int. Cl.
| | |
|---|---|
| C10G 1/10 | (2006.01) |
| C08J 11/10 | (2006.01) |
| B29B 17/04 | (2006.01) |
| B30B 11/24 | (2006.01) |
| C10B 47/44 | (2006.01) |

(52) U.S. Cl.
CPC .......... B29B 17/04 (2013.01); B30B 11/246 (2013.01); C10G 1/10 (2013.01); *B29B 2017/0496* (2013.01); C10B 47/44 (2013.01)

(58) Field of Classification Search
None
See application file for complete search history.

(56) References Cited

U.S. PATENT DOCUMENTS

| | | | | |
|---|---|---|---|---|
| 4,686,008 A | * | 8/1987 | Gibson | ............... C10B 7/10 201/33 |
| 2008/0006520 A1 | * | 1/2008 | Badger | ............... C10B 49/20 202/96 |
| 2016/0017232 A1 | * | 1/2016 | Ullom | ............... C10B 7/10 201/32 |

FOREIGN PATENT DOCUMENTS

| | | |
|---|---|---|
| CN | 103358529 A | 10/2013 |
| HU | 1100230 A2 | 1/2013 |

(Continued)

OTHER PUBLICATIONS

JP2001123181A English Machine Translation pp. 1-12 (Year: 2019).*

(Continued)

*Primary Examiner* — Philip Y Louie
(74) *Attorney, Agent, or Firm* — Millen White Zelano and Branigan, PC; Csaba Henter

(57) ABSTRACT

Pre-shredded, solid plastic and/or rubber waste is fed in to a melting unit (4), of two sequentially linked melting units (41,42), where the first melting unit (41) is constructed with an extruder axis (39) with a thread interruption (44), which shall cause solidity of the melted feedstock and formation of a compaction and a plug, thereby forcing the gases and steams to escape from the feedstock and to prevent backflow of gases, via an interconnecting pipeline (28) a second melting unit (42) is mounted, from where the heated high pressure melted feedstock flows into the thermocatalytic reactor (7), where thermal decomposition of the hydrocarbon polymers in the feedstock takes place, then is followed by the collection and storage of the liquid product oil and gaseous end products.

17 Claims, 6 Drawing Sheets

(56) References Cited

FOREIGN PATENT DOCUMENTS

JP          2001123181 A  *  5/2001
RU           2329895 C2     7/2008

OTHER PUBLICATIONS

International Search Report for PCT/IB2014/000422 dated Dec. 11, 2014.
English Abstract of RU2329895, Publication Date: Jul. 27, 2008.
English Abstract of CN103358529, Publication Date: Oct. 23, 2013.
English Abstract of HU1100230, Publication Date: Jan. 28, 2013.
Search Report in corresponding CA 2969070 dated Jun. 4, 2018 (pp. 1-3).

* cited by examiner

METHOD AND APPARATUS FOR UTILIZATION OF PLASTIC AND OTHER WASTE MATERIALS

The subject of the invention is a method for utilization of plastic and other waste materials in the energy industry, during which method we utilize plastic, rubber and other waste materials, which are dangerous to the environment, such waste materials are available in large quantities and cannot be utilized otherwise, and the end products are generated with low emission levels serve as sources of energy and other industrial materials, and are suitable for use in the energy industry, the power plants, modern burners as well as by internal combustion engines. The subject of the invention furthermore the apparatus for the realization of the method.

Nowadays, large quantities of plastic and rubber waste is generated, arising from their favorable characteristics, as well as due to reasons of social demand for their application and use, furthermore the tendency of the demand for utilization of plastic and rubber is on the rise. The feedstock, which is suitable for being utilized by the technology is the group of polyolefins and polystyrene. Aside from the detailed listing of the groups of the materials, which are unsuitable for being processed, however the processing of certain groups of plastic are not desirable by the technology, e.g. PVC, PUR.

According to the state of the art, in line with the increasing price of fossil fuels, growing number of modern technological solutions are generated.

According to the state of the art, the article by A. V. Bridgewater et Al; Fast pyrolysis processes for biomass; Renewable and sustainable energy reviews 4 (2000) 1-73 makes known processes for fast pyrolisis of biomass. As stated in the article, the fluid fuels generated are more advantageous in terms of storage and transportation as compared to the gas fuels. The fluid fuels generated are used in boilers, water heaters, motors, turbines as well as a for raw materials of chemical materials.

According to the state of the art, the article by Lawrence A. Ruth; Energy from municipal solid waste; Prog. Energy Combust Sci vol 24 pp 545-564 (1998) makes known methods for converting municipal waste into a source of energy. These sources of energy are used for generating electric energy, thereby replacing coal as a source of energy for electric energy generation.

The WO 02083816 patent description makes known a method of using materials containing coal in reactors. Materials containing coal, eg. sawdust, organic residues of sylviculture and agriculture, municipal solid waste, waste fuel are feed-in to the upward part of the reactor, where they interact with inorganic granular materials and with the Reactor wall at high temperature. The interaction basically takes place in an oxygen-free environment in order to achieve that the material containing coal gets largely transformed into processed gas product. This results in the formation of gas phase, which contains fluid gas and processed materials. High density ($7 \times 10^8$-$3 \times 10^{11}$ particle/m$^3$) suspension is formed in the upward part of the reactor. The mixing of materials conveying heat and the materials fed-in to the system is made to perfection. The mass ratio of the small particle heat transfer material and the carbon content material is between 1:1-10:1. The mixing of the heat transfer and the feed material had been improved, and the feed material is more rough than usual and less unified.

The JP 2004115688 patent description makes known a process and an unit for gasification of waste, such as biomass, organic waste RDF and RPF. Waste, containing coke is feed-in to a rotating chamber, and inside the chamber is the core-tube of the firing area as well as a stumper, which mixes its inner part. The waste is gasified in the gasification part of the core-tube. The tar and/or coke produced in the course of thermo-decomposition is gasified in the gas converter part, located in the downward direction of the core-tube. The coke mixed with the residue is removed from the core-tube of the firing area.

The KR 20050112929 patent description makes known a method for producing solid fuel, using plastic waste.

The Hungarian patent numbered HU 227728 makes known a solution, whereby thermoplastic plastic and rubber waste and other organic materials are processed by the method described and the unit introduced, and an end product—for example oil—suitable for use in power plants is generated. The method described is suitable for processing waste, which cannot be re-used otherwise in the plastic rubber technology. The solution described herein outlines a method, whereby the feedstock is fed-in to the reactor by a conventional screw system. The disadvantage of this solution is that due to the initial, first change of physical state, the melted feedstock gets stuck into the upper reactor tube, the result of which is the obstruction of the feedstock conveying system. In this case, when a conventional screw system is applied, the only solution can be that the screw system transports less feedstock into the upper reactor type than theoretically allowed. The lower amount of feedstock fed in to the reactor tube gets melted more quickly, thereby avoiding the feedstock sticking into the reactor tube. The overall result of such a precautionary action is that the system operates with lower efficiency.

The subject of the HU P1100230 Hungarian patent application filed in on Jan. 28, 2013 is the utilization of plastic and other waste for use in the energy industry. This patent describes a solution, whereby the feedstock is feed-in to the reactor in a melted state by a pre-heated extruder. The waste is converted into fuel by a thermocatalytic process (thermocatalytic decomposition) suitable for use by the energy industry. The subject of the invention is also the end product of the process.

During the method described in the above patent application, the solid plastic, rubber and other organic feedstock is decomposed in the course of heat-up, and the steams and the gases generated are cooled down and decomposed into fluid and gas fractions, then the end products generated are used depending on their characteristics, the shredded feedstock is fed into the heated extruded by a pneumatic conveying system, while the catalyst is fed in to the heated extruder by a catalyst conveying system, where this mix is heated by the extruder and turned into a melted phase. This melted feedstock is then fed into the reactor. The melted feedstock is decomposed by a thermocatalytic process (thermocatalytic decomposition), and the slag, a byproduct of the process is removed by the slag remover system at the lower part of the reactor. The fluid phase of the hydrocarbon produced in the course of the thermocatalytic decomposition the oil leaves the reactor in steam phase via the product pipeline, to reach the condenser. The additional product of the thermocatalytic decomposition, the product gas, reaches the condenser together with the steams of the fluid phase. The product gas leaves the condenser as well, and gets into the gas cooler. The oil, which leaves the condenser and the gas cooler is transported into the oil cleaning system, where it undergoes mechanical cleaning. The cleaned oil is transported into the oil tanks before being transported into the power station via the oil pipeline. The additional subject of this invention is the end product itself, generated from plastic and rubber waste, suitable for use by the energy industry, the characteristic of which is that it is produced by the method according to the invention.

When working out the solution according to the invention the aim was, that the thermocatalytic decomposition and the entire process should take place at higher efficiency, the air mixed with the feedstock should not get into the reactor, which would lower the efficiency of the thermocatalytic decomposition, furthermore that the gases generated in the reactor should not leave into the air.

When creating the solution according to the invention the recognition was, that if two, sequentially mounted melting unit is used, out of which at least in one but preferably in both of them the air and other gases get sealed out owing to the application of specially designed worm-cut mounted on the extruder axis, as well as if it is achieved that a gas isolation plug emerges from the melted feedstock and thereby the so melted higher pressure feedstock, free of air and other gases is fed into the reactor, then the set aim can be achieved.

The invention is a method for utilization of plastic and other waste in the energy industry, whereby the pre-shredded, solid plastic and/or rubber waste in the prescribed size is being heated and decomposed by a thermocatalytic decomposition process, and the steams and gases, which develop are cooled and are separated into their components in liquid and gas phase. The method is characterized by that, the shredded solid waste is fed in to a melting unit, which is made of two sequentially linked melting units, where one of which the first melting unit is constructed with an extruder axis with a thread interruption, which shall cause solidity of the melted feedstock and formation of a compaction and a plug, thereby forcing the gases and steams to escape from the feedstock and to prevent back-flow of gases, furthermore after the first melting unit via an interconnecting pipeline a second melting unit is mounted, from where the properly heated high pressure melted feedstock flows into the thermocatalytic reactor, where thermal decomposition of the hydrocarbon polymers in the feedstock takes place, then is followed by the collection and storage of the liquid product oil and gaseous end products as well as the further use thereof.

In one of preferred applications of the method according to the invention, the oil mud separated in the product oil cleaning unit and is moved back into the reactor through the oil mud recycling pipeline.

In another preferred application of the method according to the invention, the product gas cleaned in the product gas cleaning unit is moved back into the gas burner, mounted on the pre-combustion chamber through a technological gas pipeline.

In a further preferred application of the method according to the invention, the waste material applied as feedstock, is thermoplastic plastic and rubber which contains maximum 2-3% PVC (polyvinyl chloride) or polyurethane foam.

In a further preferred application of the method according to the invention, the size of the shredded plastic and/or rubber waste pieces shall be maximum 15-20 mm.

In a further preferred application of the method according to the invention, feedstock in the extruder in the melting unit is heated, in addition to the heat gained from friction energy, through the extruder jacket by the thermo oil flowing through the exhaust gas heat exchanger via the thermo oil pipeline and, if required, by auxiliary electric energy.

In a further preferred application of the method according to the invention the feedstock is heated up in extruder unit of the first melting unit of the melting unit to 150-200° C., which is followed by a further heat-up in the second melting unit of extruder unit to 350° C.

In a further preferred application of the method according to the invention, the extruder axis of the extruder unit in the second extruder melting unit is shaped with continuous screw thread or with thread interruption.

In a further preferred application of the method according to the invention, in case of advantageous implementation the length and the diameter of the worm thread on the extruder axis is different from the length and the diameter of the other worm thread, furthermore, in case of another advantageous realization, the entire extruder axis is slightly tapered, preferably with angles between 1°-3°, for example 2°

The invention is furthermore an apparatus for utilization of plastic and other waste materials in the energy industry, which is characterized by that, the apparatus is designed to apply the method according to the invention.

BRIEF DESCRIPTION OF THE DRAWINGS

The FIG. 1 shows the flowchart of the method according to the invention.

In the FIGS. 2,3,4 are shown the embodiment of the melting unit from different views.

Figure 5:
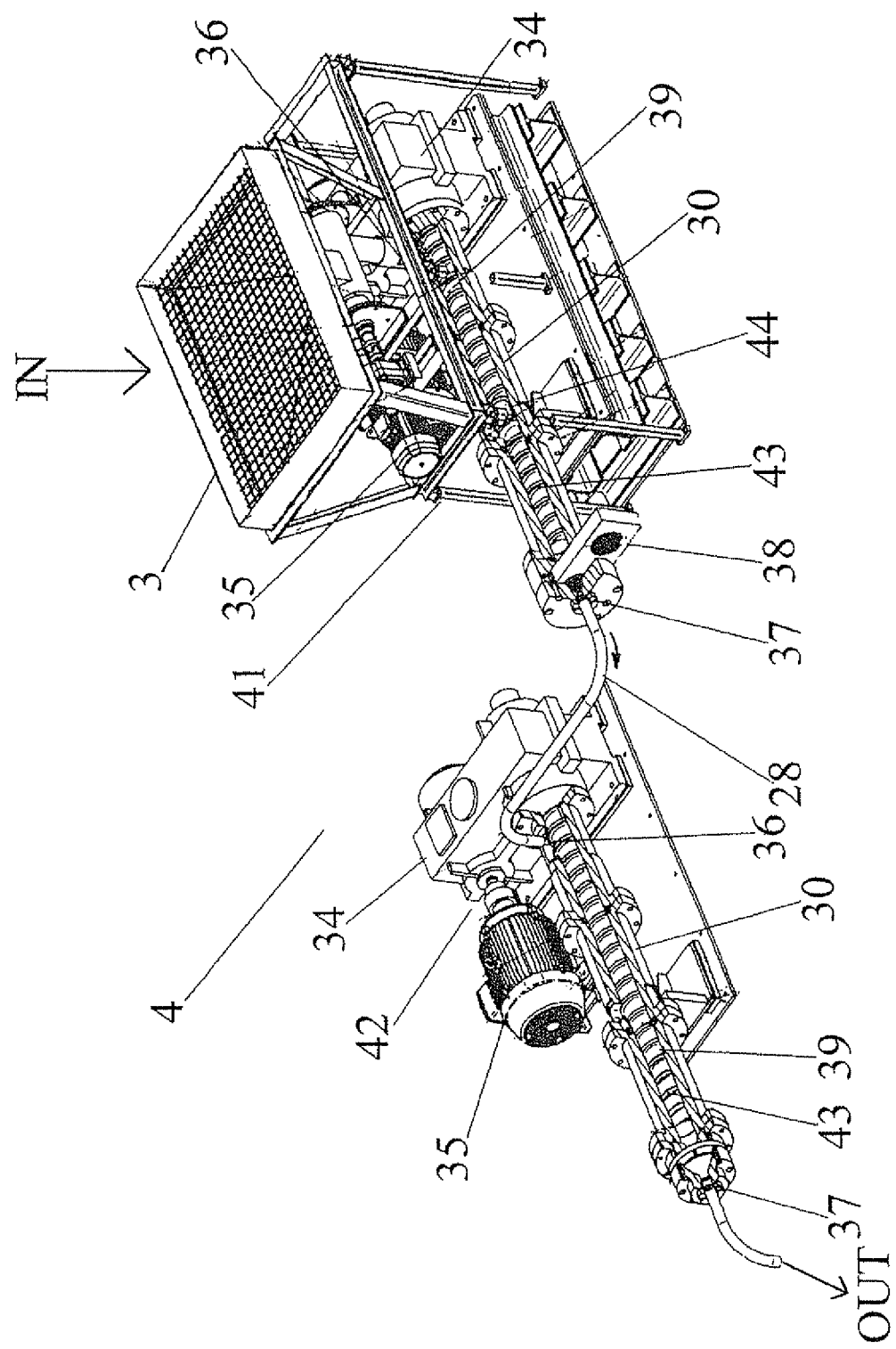

The FIG. 5 shows the embodiment of the melting unit in perspective view.

Figure 6:
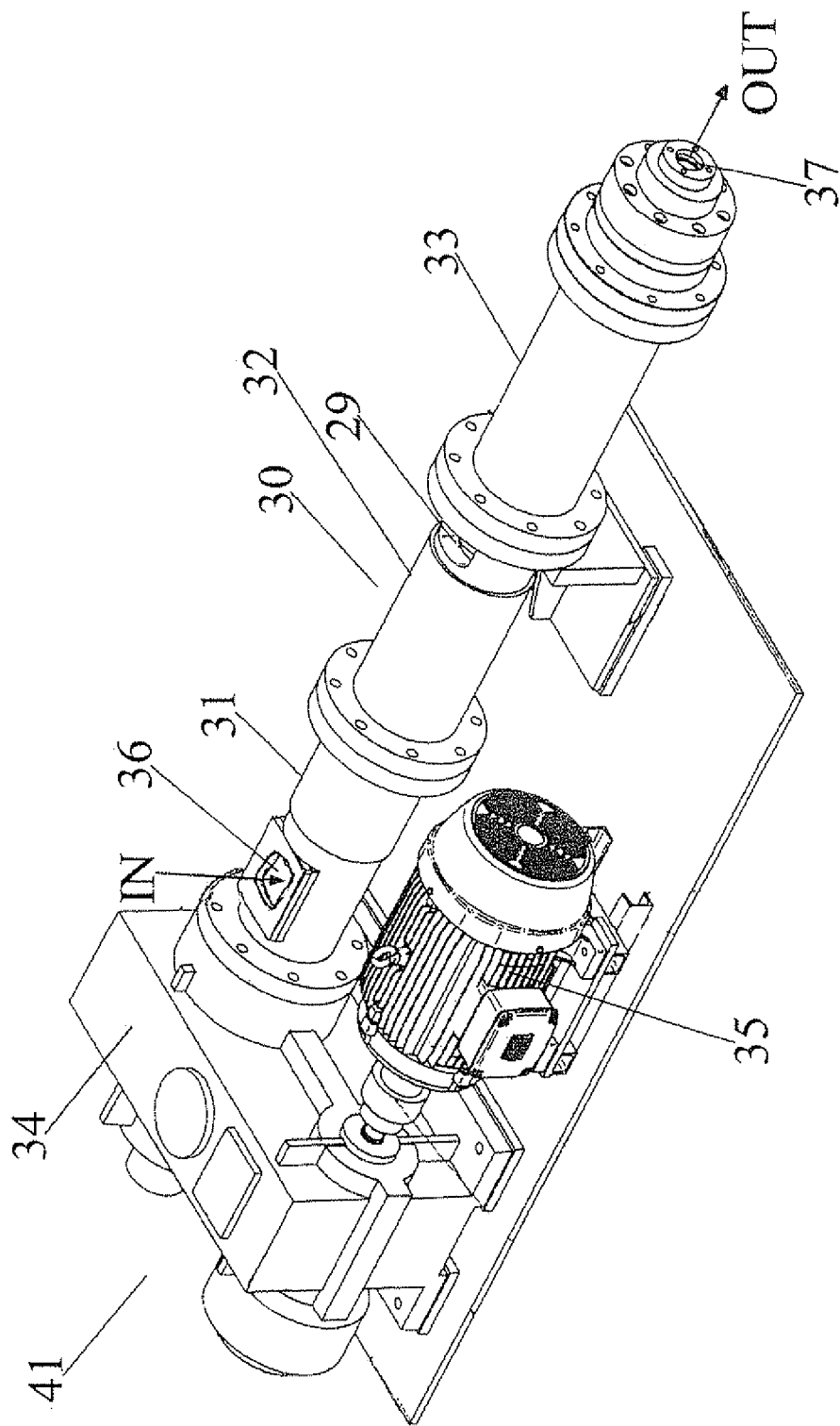

The FIG. 6 shows the embodiment of the first melting unit with the driving mechanism and the adjacent electro motor.

Figure 7:
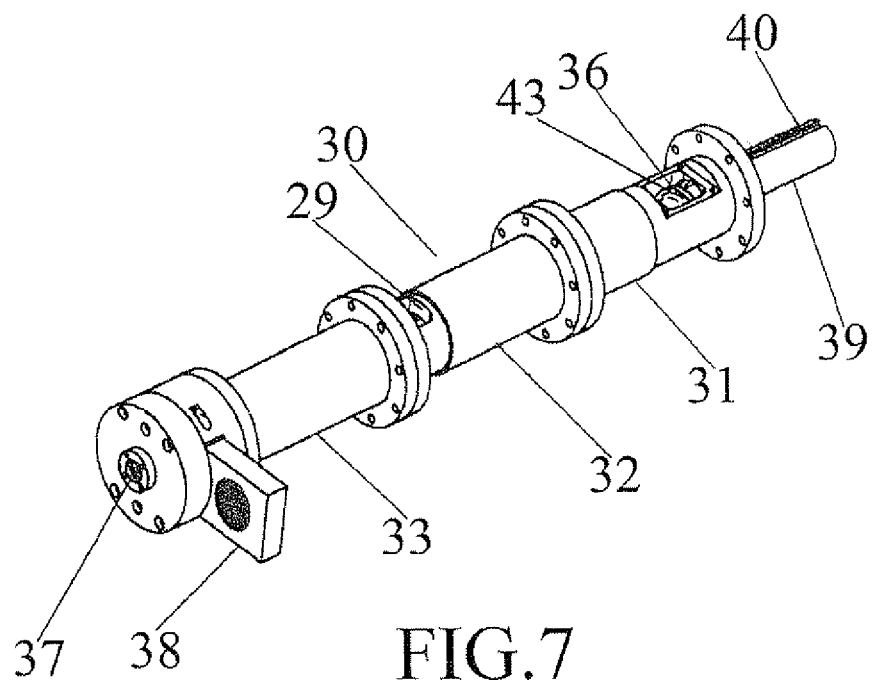

The FIG. 7 shows the extruder unit of the first melting unit in spatial view.

Figure 8:
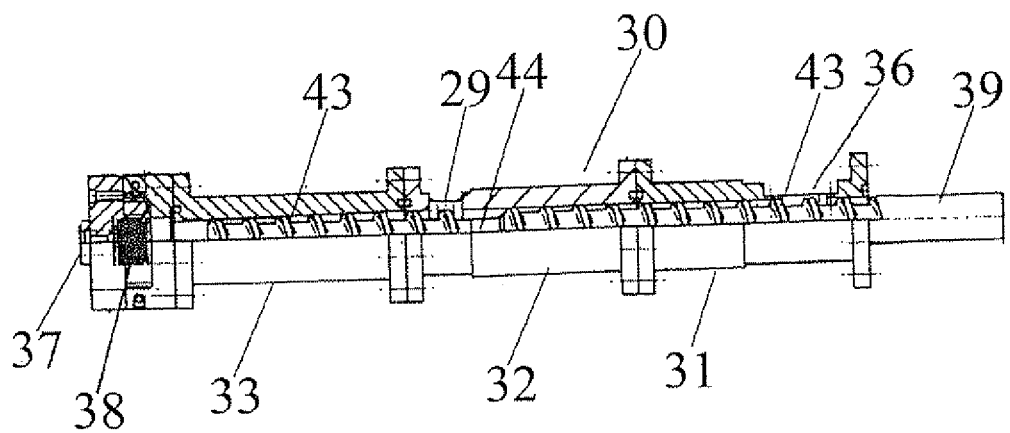

The FIG. 8 shows the extruder unit in half section view.

Figure 9:
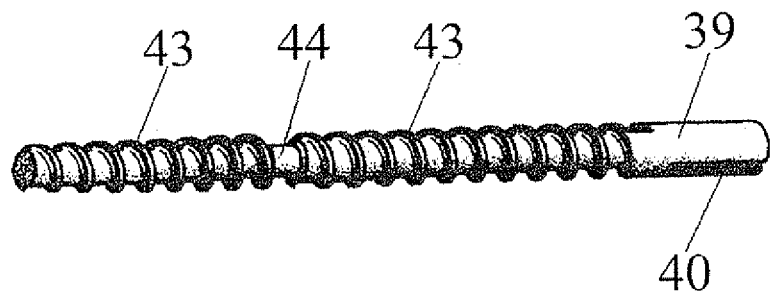

The FIG. 9 shows the extruder axis in perspective view.

Figure 10:
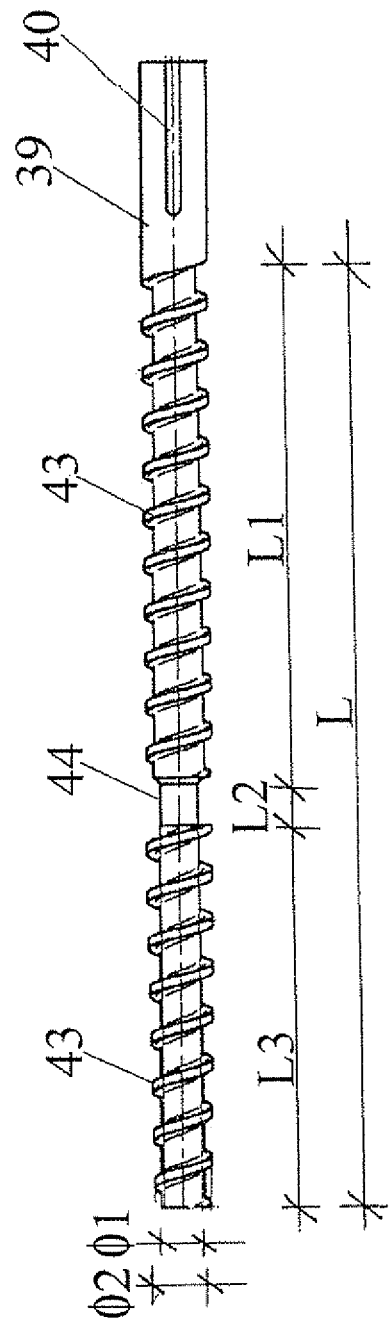

The FIG. 10 shows the extruder axis in side view.

Figure 11:
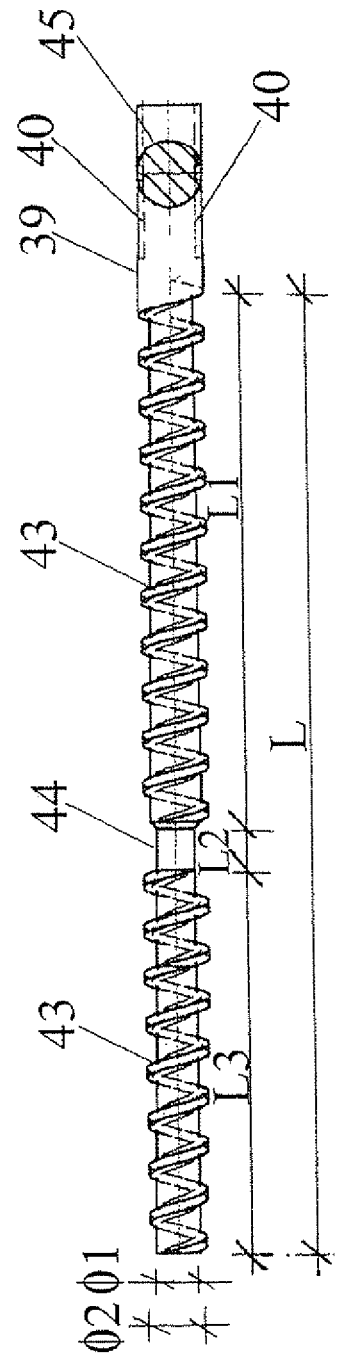

The FIG. 11 shows the extruder axis in side view, from the another side of the axis.

Figure 1:
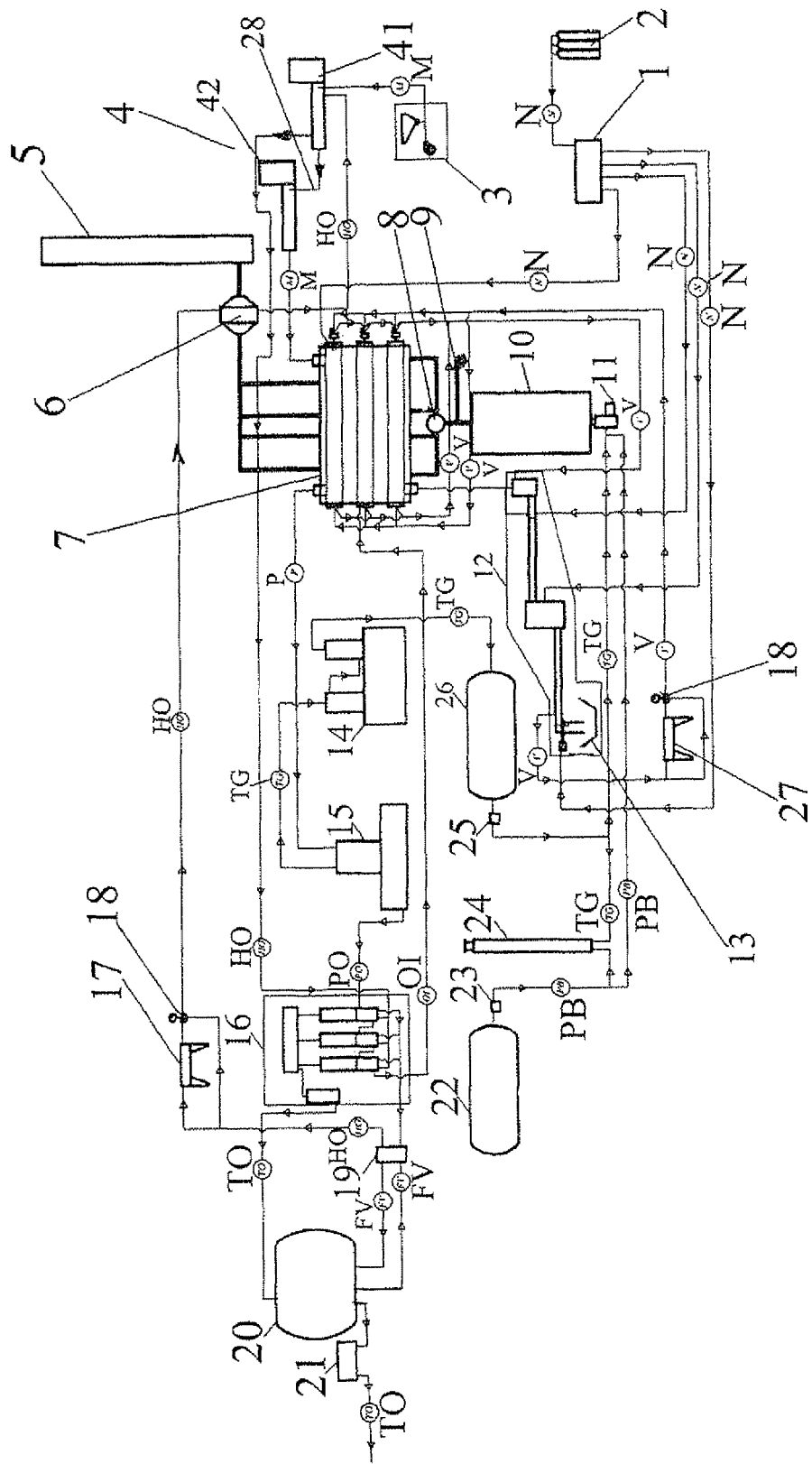

The FIG. 1 shows the flowchart of the method according to the invention. In the FIG. 1 can be seen the pressure control 1, which controls the use of the nitrogen and is connected to the nitrogen gas tank 2. Furthermore the FIG. 1 shows the pneumatic material feed-in system 3 connecting to the melting unit 4 consists of the first melting unit 41, and the connected the second melting unit 42. Furthermore the figure shows the chimney, 5 which is there to take the exhaust gases into the open air and is connected to the unit through the thermo oil/exhaust gas heat exchanger 6 as well as the figure shows the entire thermocatalytic reactor 7, the flue gas mixing chamber 8, which regulates and controls the temperature of the flue gas, as well as the interconnected air inlet fan 9.

Furthermore, the figure shows the pre-combustion chamber 10 and the adjacent gas burner with dual fuel operation 11. One gas supply source is provided by the propane butane gas tank 22 and the interconnected propane butane gas inlet unit 23, while the other one is the product gas pressure control and measurement unit 25, the product gas tank 26 and as a security unit, the gas torch 24. The slag is removed from the reactor by the slag removal system 12 to the slag storage tank 13 and the cooling is provided by technological water table cooler 27.

The hydrocarbon seams/gases leave the thermocatalytic reactor 7 through a pipeline into the condenser 15, where they condense into fluid phase. The hydrocarbon in gas phase get to the product gas cleaning unit 14, while the product oil in liquid phase gets further cleaned in the product oil cleaning unit 16. Furthermore, the figure shows the three-way valve 18, the thermo oil/heating fluid exchanger 19 as well as the thermo oil forced cooler 17 interconnected to the thermo oil circle.

Further to the above, the heated product oil storage tank 20 and the connecting product oil measurement and removal system 21 are also shown in the FIG. 1. The propane butane gas tank 22 and the interconnected propane butane gas inlet unit 23, the gas torch 24 the product gas pressure control and measurement system 25, the product gas tank 26 the dry cooler for technological water table cooler 27, the interconnecting pipeline 28 are also shown in FIG. 1. The interconnecting pipeline 28 is located between the first melting unit 41 and the second melting unit 42.

In the FIG. 1 are shown the pipelines of the flow and transportation directions of the heating liquid FV, the thermo oil HO, the product oil TO, oil mud OI, the piro oil PI, the product gas TG, the propane butane gas PB, the cooling water V the thermoplastic plastic waste M and the nitrogen gas N.

Figure 2:
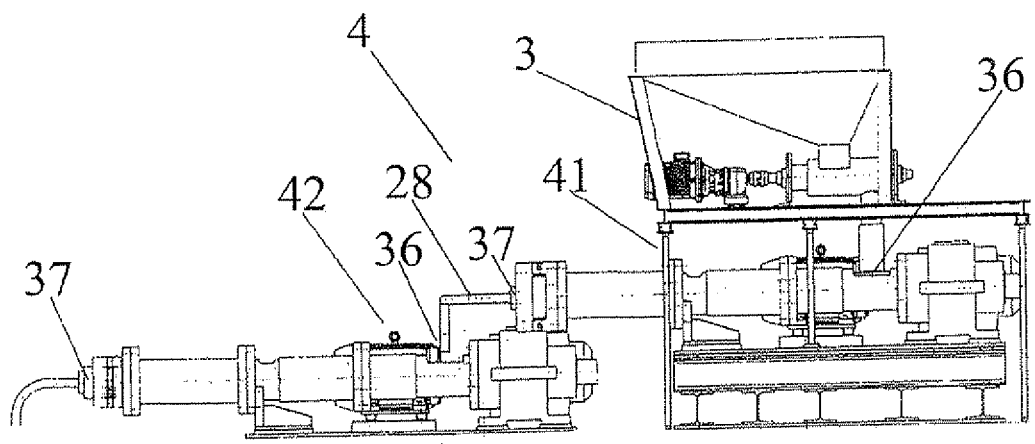
Figure 3:
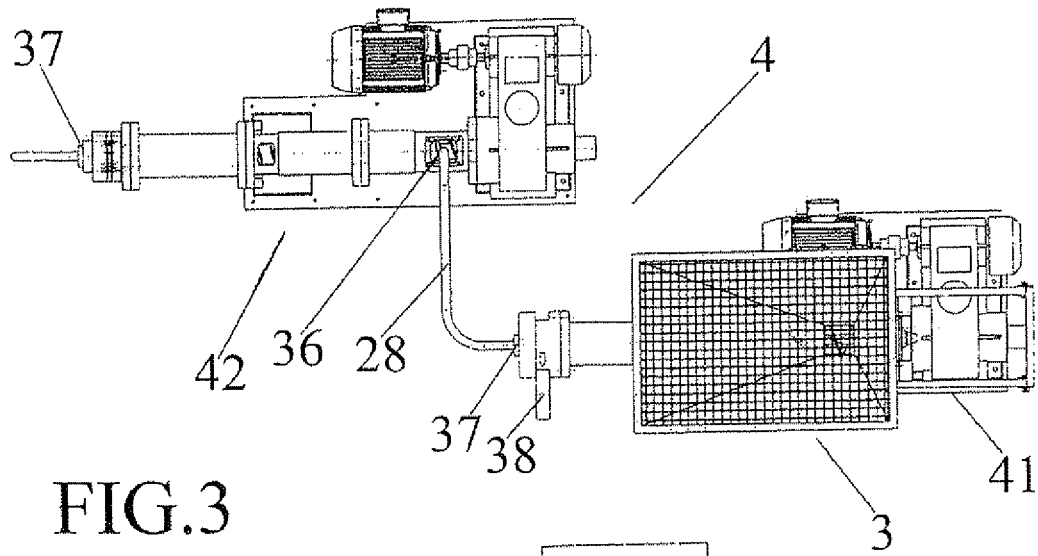
Figure 4:
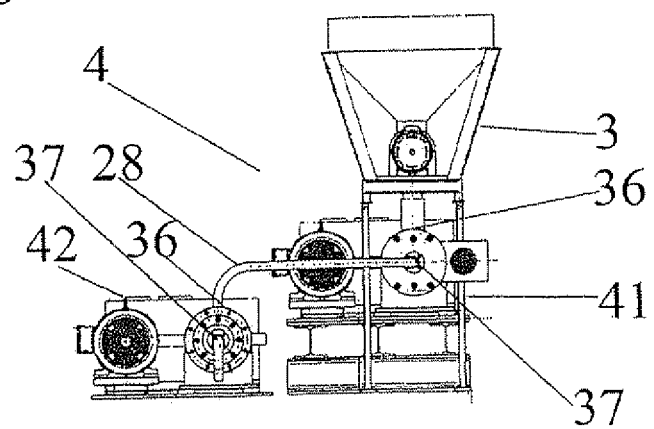

In the FIGS. 2,3,4 are shown the embodiment of the melting unit 4 from different views. The figures show the pneumatic material feed-in system 3, as well as the melting unit 4, which consists of two parts, the first melting unit 41 and the second melting unit 42. Also shown in the figures the inlet slot 36 and the outlet slot 37, which two units are connected by the interconnecting pipeline 28.

The FIG. 5 shows the embodiment of the melting unit 4 in perspective view. The melting unit 4, shown in FIG. 5, consists of two parts, the first melting unit 41 and the second melting unit 42. The pneumatic feed-in system 3, the electro motor 35 and the driving mechanism 34 of the first melting unit 41 are clearly visible. Furthermore, the extruder unit 30 is shown in FIG. 1, as well as the extruder axis 39, the worm thread 43, the thread interruption 44 between the screw threads 43, the inlet slot 36, the outlet slot 37, and the filter 38 mounted therein.

The figure also shows the first melting unit 41 and the second melting unit 42 as well as the interconnecting pipeline 28 mounted in between the two units. The figure clearly shows the electro motor 35 and the driving mechanism 34 of the second melting unit 42, furthermore, shown in FIG. 1 are the extruder unit 30 and the extruder axis 39, as well as the worm thread 43 mounted inside, and the inlet slot 36 and the outlet slot 37 are also shown.

The solid waste shredded to the required size is fed-in through the hopper mounted at the end of the pneumatic material feed-in system 3. As shown in the figure, the screw thread 43 of the extruder axis 39 of the first melting unit 41 is shaped with thread interruption 44, which enables the formation of a plug from the melted feedstock. The screw thread 43 of the extruder axis 39 in the second melting unit 42 is continuous. It serves the purpose of continuous transportation of the melted feedstock. The melted, high pressure and high temperature feedstock leaves the melting unit 4 and enters the thermocatalytic reactor 7 through the outlet slot 37 of the second melting unit 42.

The FIG. 6 shows the embodiment of the first melting unit 41 with the driving mechanism 34 and the adjacent electro motor 35. The figure also shows the extruder unit 30, which is made of extruder segments 31,32,33, and the inlet slot 36 located on the first extruder segment 31, the gas/steam outlet slot 29 positioned on the second extruder segment 32 and the outlet slot 37 located at the end of the third extruder segment 33 are clearly shown.

The FIG. 7 shows the extruder unit 30 of the first melting unit 41 in spatial view. The FIG. 7 shows the extruder unit 30 as well as the extruder segments 31, 32, 33, furthermore the inlet slot 36 located on the first extruder segment 31. The gas/steam outlet slot 29 is mounted on the second extruder segment 32, while the outlet slot 37 as well as the filter 38, which enables lumpy crocks take-away, are located at the end of the extruder unit 30. The figure clearly shows the extruder axis 39 with the screw thread 43 of the extruder unit 30, as well as the nut 40 located at the end of the extruder axis 39, serving the purpose of mechanical drive.

The FIG. 8 shows the extruder unit 30 in half section view. The extruder unit 30, which consist of extruder segments 31,32,33 are shown clearly, as well as the inlet slot 36 on the upper side of the first extruder segment 31, the gas/steam outlet slot 29 mounted on the second extruder segment 32 as well as the outlet slot 37 and the filter 38 located on the end of the extruder unit 30.

The extruder axis 39 with the screw thread 43 and the thread interruption 44 of the extruder unit 30 is perfectly visible in the figure. As shown in the figure, the gas/steam outlet slot 29 is located on the second extruder segment 32 just before the thread interruption 44 on the extruder axis 39. This allows the gases and steams, for example the air and the steam, formed from heating up the water mixed with the feedstock, to escape from the stopper, which is forming of the melted feedstock at the thread interruption 44.

The FIG. 9 shows the extruder axis 39 in perspective view. The figure shows the extruder axis 39 with the nut 40 as well as the thread interruption 44 between the two screw thread 43 sections.

The FIG. 10 shows the extruder axis 39 in side view. The figure shows the extruder axis 39 with its total thread length L with the nut 40 at one end as well as the screw thread 43 with its first thread length L1 and diameter Φ2, furthermore, the other screw thread 43 with its third thread length L3 and diameter Φ1 as well as the thread interruption 44 with its length of second thread length L2.

The FIG. 11 shows the extruder axis 39 in side view from the another side of the axis 39. The figure shows the extruder axis 39 with its total thread length L and with the two nuts 40 positioned on the opposite side from each other, which serves the purpose of mechanical drive as well as the mechanic clamper 45. The figure shows the screw thread 43 with its first thread length L1 and diameter Φ2 as well as the screw thread 43 with its third thread length L3 and diameter Φ2, furthermore the thread interruption 44 with its second thread length L2.

In case of an advantageous implementation, the diameter of Φ1 of the screw thread 43 with length L1 is different from the screw thread 43 with third thread length L3 and a diameter Φ2. In case of another advantageous embodiment, the entire extruder axis 39 is slightly tapered, preferably by angles between 1°-3°, for example 2°. By applying different screw thread lengths L1 and L3 as well as the specific thread interruption 44 with its length of L2, it becomes feasible to achieve gas solidity and to prevent back-flow of gases even in case of processing feedstock of different mix and quality, as well as to facilitate the gas and steam escape during the processing.

DETAILED DESCRIPTION OF THE TECHNOLOGICAL PROCESS

In case of the actual application of the process according to the invention, the initial step of the technological process is the feed-in of the feedstock into the technology. The feedstock is thermoplastic plastic, rubber or any other organic waste in such a quality that is suitable for processing. This feedstock is shredded using the appropriate shredder. Depending on the type of raw material changes the shredding rate.

In general, the mix of different plastic is shredded to the preferably 15-20 mm pieces, in case of other feedstock the prescribed size may be bigger and may reach 20-30 mm, however this is largely dependant on the physical condition and characteristics of the feedstock.

The initial step in applying the technology is that the feedstock, shredded to the prescribed size, is fed-in by a pneumatic feed-in system to the melting unit 4, which is made up of two sequentially connected melting units 41,42. The process of thermocatalytic decomposition is aided by a catalyst, the amount of which is specifically defined related to the quantity (material flow) of the feedstock, the mixing of the catalyst to the feedstock takes place in the hopper the same time, when the feedstock input takes place.

The melting units 41,42 contain the extruder units 30. In the course of applying the technology, the extruder units 30 are heated in order to achieve as high feedstock temperature as possible (minimum 350° C.), thereby to guarantee that the feedstock is soft or fluidic.

The jacket of the extruder unit 30 is heated by the thermo oil and, if required, by electric energy as well as by the friction energy forming in the feedstock within the extruder unit. As a result of this dual heating method, the feedstock reaches the temperature of at least 150-200° C. already in first extruder unit 30 in the first melting unit 41.

Owing to pre-heating the feedstock, its initial change of state of condition starts already in the first extruder unit 30, and the feedstock starts to become soft and fluidic. Properly the solution according to the invention the worm thread 43 of the extruder axis 39 is shaped in a way that it includes a thread interruption 44. While the extruder axis 39 is turning, this thread interruption 44 causes feedstock solidity and the formation of a local plug, which triggers the inherent gases and steam to escape through the gas/steam outlet slot 29. At this point, the temperature of the feedstock is around 100-150° C., therefore it is soft and partially fluidic only. The inherent gases and steams escape through the gas/steam outlet slot 29. As a next step, the next worm thread 43 on the extruder axis 39 forwards the feedstock, which is becoming increasingly hot and solid, towards the outlet slot 37 on the extruder unit 30. There is a filter 38 mounted before the outlet slot 37 of the extruder unit 30, which serves the purpose of filtering the mechanical lumpy crocks from the feedstock.

The interconnecting pipeline carries the melted feedstock from the outlet slot 37 of the extruder unit 30 into the second melting unit 42 of the extruder unit 30. In this extruder unit 30, the extruder axis 39 is either designed with a worm thread interruption 43 or with uninterrupted screw thread. At the outlet slot of the second extruder unit 30 the feedstock is completely fluidic, with high temperature, around 300-350° C., and high pressure, and gets into the upper tube of the thermocatalytic reactor 7 with these characteristics. Owing to the high pressure, the fluidic feedstock changes its state of condition to gas phase therein. The change of pressure and the high temperature in the reactor facilitates and speeds-up of the decomposition of the polymers.

The purpose of the creation of a plug in the first melting unit is to prevent the back-flow of gases, which are forming in the reactor, into the outer area. Furthermore, the plug prevents the in-flow of oxygen into the reactor, where oxygen would cause non-desired burning. This solution increases the efficiency of the entire process, allows larger quantities of feedstock to be processed and thereby triggers an increased efficiency of the entire system.

The thermocatalytic decomposition takes place in an oxygen-free environment, therefore the major characteristic of the apparatus is that it is a closed system in every aspect. During the feeding the closeness is ensured by the design of the entire melting unit 4.

There structure of the thermocatalytic reactor 7 is segmented into three parts, wherein there is a continuous flow of feedstock. The thermocatalytic reactor 7 consist of three horizontally mounted reactor tubes. The fluidic feedstock flows from the melting unit 4 into the upper-most reactor tube of the reactor 7. The feedstock flows from the upper-most reactor tube into the middle reactor tube and then onwards into the lower-most reactor tube, where the solid Slag is being removed from the thermocatalytic reactor 7 by the slag remover system 12.

All three tubes of the thermocatalytic reactor 7 are heated by the flue gas generated in the pre-combustion chamber 10, the temperature of which is set in the flue gas mixing chamber 8 for proper temperature. This is the method, how the thermal energy needed for the decomposition of the thermoplastic plastic, rubber and other organic waste is generated. The exhaust gas, which flows in the layered walls of the thermocatalytic reactor 7 heats up those parts thereof, which are capable of transmitting heat.

The plastic, rubber and other organic waste materials are melted in the melting unit 4. The temperature of this melted, fluidic feedstock increases in the thermocatalytic reactor 7 to reach the level required for thermocatalytic decomposition.

In case of plastic waste, the temperature in the thermocatalytic reactor 7 is kept on the level of 460-480° C. at which temperature the feedstock stays for 16-18 minutes;

In case of rubber and technical rubber, the temperature in the thermocatalytic reactor 7 is kept on the level of 475-495° C. at which temperature the feedstock stays for 18-20 minutes.

The liquid phase of the hydrocarbon, generating in the course of thermocatalytic decomposition is oil. The liquid phase leaves the thermocatalytic reactor 7 in gas phase state of condition and gets into the condenser 15 through the product pipeline. The other product of the thermocatalytic decomposition, which takes place in the thermocatalytic reactor 7 is the product gas, which leaves the thermocatalytic reactor 7 together with the steams of the liquid Phase. It gets into the condenser 15 through the product pipeline. The flue gas, which flows in the layered walls of the thermocatalytic reactor 7 goes through the exhaust gas heat exchanger 6 and leaves it through the exhaust gas pipeline to the open air via the chimney 5. The thermo oil, which comes out of the exhaust gas heat exchanger 6 through the thermo oil Pipeline into the jacket of the extruder unit 30 of the melting unit 4 heats up the jacket of the extruder unit 30. The chilled thermo oil, which leaves the jacket of the extruder unit 30 returns back into the exhaust gas heat exchanger 6.

The heavier hydrocarbons are separated from the flow in the condenser 15. By applying multiple, sequentially mounted condensers 15, the differentiation of the liquid phases becomes feasible, whereby liquids of different characteristics are obtained. It is needless to highlight that the different combinations of the carbon-chain combinations of the hydrocarbons are condensed in accordance to their condensation temperature and are collected in the liquid collection parts of the condenser 15.

The product gas flows from the condenser 15 into the product gas cleaning unit 14, where the different components containing sulphure, cloryane, fluoryne are extracted.

The oil, which leaves the condenser 15 flows into the product oil cleaning unit 16. The oil gents cleaned in the product oil cleaning unit 16. The viscosity of the oil at the increased temperature is kept at a level on which the solid residue contents are capable of separation from the liquid phase at the lowermost internal frictionous conditions gained from external means of power. The cleaned oil leaves the product oil cleaning unit 16 and flows for temporary storing into the product oil temporary storage tank 20.

The oil leaves the temporary product oil storage tank 20 through the oil pipeline and gets utilized further. The crock, the oil mud OI is separated in the product oil cleaning unit 16 and is moved back into the thermocatalytic reactor 7 through the oil mud recycling pipeline.

The product gas leaves the product gas cleaning unit 14 through the technological gas pipeline into the product gas tank 26. This is the tank, from where it is taken back to the gas burner 11, mounted on the pre-combustion chamber 10. Burned in this gas burner 11, the product gas ensures that system—while it is in continuous operation—does not require external sources of energy. The product gas TG, which arises as an end-product of the process might as well be sufficient to provide for the energy requirement of other process.

The slag, leaving the thermocatalytic reactor 7 is cooled and is removed by the slag removal system 12 into the slag storage tank 13. The slag is removed from the slag storage tank 13 in batches for further use.

In case of advantageous application of the solution according to the invention, the thermoplastic plastic and rubber, containing organic coal, as well as other organic waste are processed and utilized in a way that by using the method and the apparatus referred to herein, such an end product—in certain situations oil, coke, flammable gases—is generated, which is suitable for use in power plants and for energy generation. The solution presented is also suitable for processing waste, which is no longer recyclable into the plastic and rubber manufacturing technologies.

The appropriate setting of the special technological parameters applied in the process, as well as the addition of the required additives enable the generation and production of Oil, suitable for use in power plants Fuel, appropriate to power internal combustion engines Oil and other oil fragments, to be used in the chemical industry Oil, suitable for cracking by the oil industry.

Taking the mechanical engineering, thermo-technological and chemical aspects into consideration, the technology is designed in a way, whereby the distribution of the produced, so called thermo-conversion products prefers the weight proportion of oil. The catalysts used in the process ensure achieving such a range of parameters of the oil, which allows its use in special circumstances in stationer operation internal combustion engines. The optimization of the process is done in such a way to achieve the increase of the weight proportion of oil. The oil produced in such a way is suitable for use in power plants to generate electric and/or thermal energy.

In case of advantageous, concrete application, in case of the process according to the invention, the feedstock is primarily mixed plastic and rubber waste. PVC, and polyurethane foam are non-desirable feedstock components due to the chlorain contained in PVC as well as by reasons of the presence of zianide in the polyurethane foam. Provided that the feedstock includes such materials, a certain proportion, not exceeding 2-4% is still manageable by the technology. Should this be the case, the decompostion will still take place, however the chloraine, which is separated at around the temperature of 200° C. may become incorporated into the end product or may escape as free chloraine gas. The purpose of the alcaline product gas cleaning unit 14 installed as a last step of the technology serves the purpose of absorbing this chloraine.

The absorption of zianides is also executed in the product gas cleaning unit (14). Whatever remains in the product gas, will be subject to heat-treatment in the pre-combustion chamber, where the gas stays at a temperature of 1200° C. for 5 seconds. This prevents the formation of dioxanes, when the product gas is being burned.

The sulphure, contained in the rubber waste is largely absorbed in the product gas cleaning unit 14, while the remaining part gets either mixed into the oil, or, and an even smaller part gets mixed up with the product gas. This latter one is burned at the end of the process. The alkaline product gas cleaning unit 14 may operate with calcium-hydroxide, as it is environmentally friendly. Out of the absorbed substances, Ca salt, e.g. gypsum is formed.

In a certain case, the final use of the liquid phase generated by the technology addresses the use in engines. The oil shall have to meet the requirements posted by the engine burning criteria, unless of this the adaptation is unsuitable for internal combustion engines. Those hydro-carbon molecule groups, which meet this requirement can only form under aided conversion. Aided conversion can, in principal, be guaranteed partially by meeting the physical characteristics of the decomposition process, and partially by adding the appropriate catalysts to the technology. The catalysts, first, determine the quality of the molecule structure, second, absorb the pollutants and, third, lower the energy requirement of the decomposition process.

The benefit of the solution according to the invention is that a melting unit, which is made up of two segments, each hosting appropriately heated extruders is used for feeding the feedstock into the reactor. This enables the processing of larger feedstock quantity under continuous operation, which triggers increased system efficiency. By facilitating the formation of a plug in the melting unit, the in-flow and back-flow of gases to and from the reactor is prevented.

By applying two sequentially mounted melting units, the increase of the pressure and the temperature of the melted feedstock becomes feasible, which triggers even greater change of pressure in the reactor. This facilitates quicker gasification, which helps the decomposition of the polymer chains, which results in even higher total process efficiency. This, as an incremental benefit, allows the processing of larger selections of Feedstock, as well as the processing of feedstock at lower segregation level. This means that, e.g. a larger proportion of PVC, or polyurethane foam, or rubber can be mixed with, or to the feedstock. The selection/segregation or treatment of the pollutants emerging from these Feedstock components is perfectly manageable by applying the post treatment technologies (selection, absorption or neutralization of chloriane, zianide, sulphure).

The other advantage of the solution according to the invention is that due to the use of an Extruder, the transmission of heat in the reactor becomes more efficient, as the heat is being transmitted to fluidic feedstock and not to solid feedstock, and this triggers increased efficiency.

The other incremental advantage of the solution according to the invention is that environmentally dangerous waste, which is being generated in large quantities that cannot be used otherwise is utilized by the technology. The result is the generation of sources of energy at low emission values, which is suitable for use in power plants, modern burners, internal combustion engines, as well as the production of industrial row materials.

LIST OF REFERENCES

1—pressure control/nitrogen/
2—nitrogen gas tank
3—pneumatic material feed-in system
4—melting unit
5—chimney
6—thermo oil/exhaust gas heat exchanger
7—thermocatalytic reactor
8—flue gas mixing chamber
9—air inlet fan
10—pre-combustion chamber
11—gas burner with dual fuel operation
12—slag removal system
13—slag storage tank
14—product gas cleaning unit
15—condenser
16—product oil cleaning unit
17—thermo oil forced cooler
18—three-way valve
19—thermo oil/heating fluid exchanger
20—product oil temporary storage tank (with heating)
21—product oil measurement and removal system
22—propane butane gas tank
23—propane butane gas inlet unit
24—gas torch
25—product gas pressure control and measurement system
26—product gas tank
27—technological water table cooler
28—interconnecting pipeline
29—gas/steam outlet slot
30—extruder unit
31—extruder segment
32—extruder segment
33—extruder segment
34—driving mechanism
35—electro motor
36—inlet slot
37—outlet slot
38—filter
39—extruder axis
40—nut (for driving)
41—first melting unit
42—second melting unit
43—screw thread
44—thread interruption
45—mechanic clamper
L—total thread length
L1—first thread length
L2—second thread length
L3—third thread length
φ1—diameter
φ2—diameter
FV—heating liquid
HO—thermo oil
TO—product oil
OI—oil mud
PO—piro oil
TG—product gas
PB—propane butane gas
V—cooling water
M—thermoplastic plastic waste
N—nitrogen gas

The invention claimed is:

1. A method for utilization of plastic and rubber waste comprising:
    feeding a pre-shredded, solid plastic and/or rubber waste feedstock in a prescribed size into a melting unit comprising two sequentially linked melting units,
    wherein a first melting unit and second melting unit are connected via an interconnecting pipeline and a first melting unit is constructed with an extruder axis with a thread interruption, which causes solidity of the melted feedstock and formation of a compaction and a plug, thereby forcing gases and steam to escape from the feedstock and to prevent back-flow of gases;
    cooling and separating the steam and gases into liquid and gas phases;
    passing the melted feedstock from the second melting unit into a thermocatalytic reactor to decompose hydrocarbon polymers in the feedstock to produce a product effluent:
    passing the product effluent to a condenser to produce a liquid product oil and gaseous end products;
    passing the liquid product oil to a product oil cleaning system to produce a cleaned liquid product oil;
    separating an oil mud from the product oil cleaning unit and moving said separated oil mud back into the thermocatalytic reactor through an oil mud recycling pipeline; and
    collecting and storing the cleaned liquid product oil and gaseous end product.

2. The method according to claim 1, wherein the plastic and/or rubber waste material applied as feedstock, is thermoplastic plastic and rubber which contains a maximum of 2-3% PVC (polyvinyl chloride) or polyurethane foam.

3. The method according to claim 1, wherein the size of the pre-shredded solid plastic and/or rubber waste pieces is a maximum 15-20 mm.

4. The method according to claim 1, wherein the feedstock is heated up in the first melting unit to a temperature of 150-200° C. and further heated up in the second melting unit to a temperature of 350° C.

5. The method according to claim 1, wherein the second melting unit comprises an extruder axis shaped with a continuous screw thread or with a thread interruption.

6. The method according to claim 1, wherein the extruder axis of the first melting unit comprises a first screw thread, a thread interruption and a second screw thread, wherein the length (L1) and diameter (Φ1) of the first screw thread is different from the length (L2) and the diameter (Φ2) of the second screw thread, and wherein the extruder axis is tapered.

7. The method according to claim 6, wherein the extruder axis is tapered at an angle between 1°-3°.

8. A method for utilization of plastic and rubber waste comprising:
    feeding a pre-shredded, solid plastic and/or rubber waste feedstock in a prescribed size into a melting unit comprising two sequentially linked melting units,
    wherein a first melting unit and second melting unit are connected via an interconnecting pipeline and a first melting unit is constructed with an extruder axis with a thread interruption, which causes solidity of the melted feedstock and formation of a compaction and a plug, thereby forcing gases and steam to escape from the feedstock and to prevent back-flow of gases;

cooling and separating the steam and gases into liquid and gas phases;

passing the melted feedstock from the second melting unit into a thermocatalytic reactor to decompose hydrocarbon polymers in the feedstock to produce a product gas;

passing the product effluent to a condenser to produce a liquid product oil and gaseous end products;

passing the gaseous end products to a product gas cleaning unit to produce a cleaned product gas;

passing the cleaned product gas to a gas burner mounted on a pre-combustion chamber through a technological gas pipeline; and collecting and storing the liquid product oil.

9. The method according to claim 8, wherein the plastic and/or rubber waste material applied as feedstock, is thermoplastic plastic and rubber which contains a maximum of 2-3% PVC (polyvinyl chloride) or polyurethane foam.

10. The method according to claim 8, wherein the feedstock is heated up in the first melting unit to a temperature of 150-200° C., and further heated up in the second melting unit to a temperature of 350° C.

11. The method according to claim 8, wherein the second melting unit comprises an extruder axis shaped with a continuous screw thread or with a thread interruption.

12. The method according to claim 8, wherein the extruder axis of the first melting unit comprises a first screw thread, a thread interruption and a second screw thread, wherein the length (L1) and diameter (Φ1) of the first screw thread is different from the length (L2) and the diameter (Φ2) of the second screw thread, and wherein the extruder axis is tapered.

13. A method for utilization of plastic and rubber waste comprising:

feeding a pre-shredded, solid plastic and/or rubber waste feedstock in a prescribed size into a melting unit comprising two sequentially linked melting units, wherein a first melting unit and second melting unit are connected via an interconnecting pipeline and a first melting unit is constructed with an extruder axis with a thread interruption, which causes solidity of the melted feedstock and formation of a compaction and a plug, thereby forcing gases and steam to escape from the feedstock and to prevent back-flow of gases;

cooling and separating the steam and gases into liquid and gas phases;

passing the melted feedstock from the second melting unit into a thermocatalytic reactor to decompose hydrocarbon polymers in the feedstock to produce a product gas:

passing the product effluent to a condenser to produce a liquid product oil and gaseous end products; and collecting and storing the liquid product oil and the gaseous end products;

wherein the melting unit further includes an extruder, the feedstock in the extruder is heated, and the heat is produced by friction energy, through an extruder jacket in which a thermos oil flows through an exhaust gas heat exchanger via a thermos oil pipeline, and optionally by auxiliary electric energy.

14. The method according to claim 13, wherein the plastic and/or rubber waste material applied as feedstock, is thermoplastic plastic and rubber which contains a maximum of 2-3% PVC (polyvinyl chloride) or polyurethane foam.

15. The method according to claim 13, wherein the feedstock is heated up in the first melting unit to a temperature of 150-200° C., and further heated up in the second melting unit to a temperature of 350° C.

16. The method according to claim 13, wherein the second melting unit comprises an extruder axis shaped with a continuous screw thread or with a thread interruption.

17. The method according to claim 13, wherein the extruder axis of the first melting unit comprises a first screw thread, a thread interruption and a second screw thread, wherein the length (L1) and diameter (Φ1) of the first screw thread is different from the length (L2) and the diameter (Φ2) of the second screw thread, and wherein the extruder axis is tapered.

\* \* \* \* \*